(12) United States Patent
Chen

(10) Patent No.: US 9,092,133 B2
(45) Date of Patent: Jul. 28, 2015

(54) ELECTRICAL WRITING BOARD

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/221,264

(22) Filed: Mar. 20, 2014

(65) Prior Publication Data

US 2014/0306902 A1 Oct. 16, 2014

(30) Foreign Application Priority Data

Apr. 16, 2013 (TW) .............................. 102113407 U

(51) Int. Cl.
*G06F 3/041* (2006.01)
*G06F 3/0488* (2013.01)
*G09G 3/38* (2006.01)
G09G 3/20 (2006.01)

(52) U.S. Cl.
CPC .............. *G06F 3/04883* (2013.01); *G09G 3/38* (2013.01); *G09G 3/2003* (2013.01); *G09G 2300/0426* (2013.01); *G09G 2320/0606* (2013.01)

(58) Field of Classification Search
CPC ... G06F 3/03545; G06F 3/03542; G06F 1/30; G06F 3/0386; G06F 3/0416; G06F 3/042; G06F 3/0425; G06F 3/038; G06F 3/0395; G06F 3/041; G06F 3/0414; G06F 3/043; G06F 3/044; G06F 3/045; G06F 3/0488; G06F 3/04883; G06F 17/30899; G09G 3/38; G09G 3/2003; G09G 5/00
USPC ............. 345/173–181, 156, 169, 1.1, 1.2, 1.3
See application file for complete search history.

(56) References Cited

U.S. PATENT DOCUMENTS

| 6,225,976 | B1 * | 5/2001 | Yates et al. ..................... 345/156 |
| 7,002,723 | B2 * | 2/2006 | Enomoto et al. .............. 359/273 |
| 7,158,276 | B1 * | 1/2007 | Peng et al. ..................... 359/265 |
| 2012/0242606 | A1 * | 9/2012 | Mackey ........................ 345/173 |

* cited by examiner

*Primary Examiner* — Duc Dinh
(74) *Attorney, Agent, or Firm* — Novak Druce Connolly Bove + Quigg LLP

(57) ABSTRACT

An electrical writing board includes a bottom color plate, an electrochromic board, a touch panel, and a driving circuit module. The electrochromic board includes a number of electrochromic units and covers the bottom color plate. The touch panel covers the electrochromic board and outputs a touch signal when the touch panel is touched. The driving circuit module is electrically connected between the electrochromic board and the touch panel, and enables a part of the electrochromic units according to the touch signal to display handwriting. The handwriting displaying on the electrochromic board is the same as a touch route sensed by the touch panel.

18 Claims, 5 Drawing Sheets

ELECTRICAL WRITING BOARD

BACKGROUND

1. Technical Field

The present disclosure relates to writing boards, and particularly to an electrical writing board.

2. Description of the Related Art

Electrical writing boards generally include a writing board, a computer, and a projector. The writing board senses a touch position and transmits the touch position to the computer. The computer generates a handwriting according to the touch positions via writing software, and controls the projector to project an image including the handwriting on the writing board. However, the writing board connects to the computer and the projector, the structure of the electrical writing board is complex, which increases cost.

Therefore, it is desirable to provide an electrical writing board to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
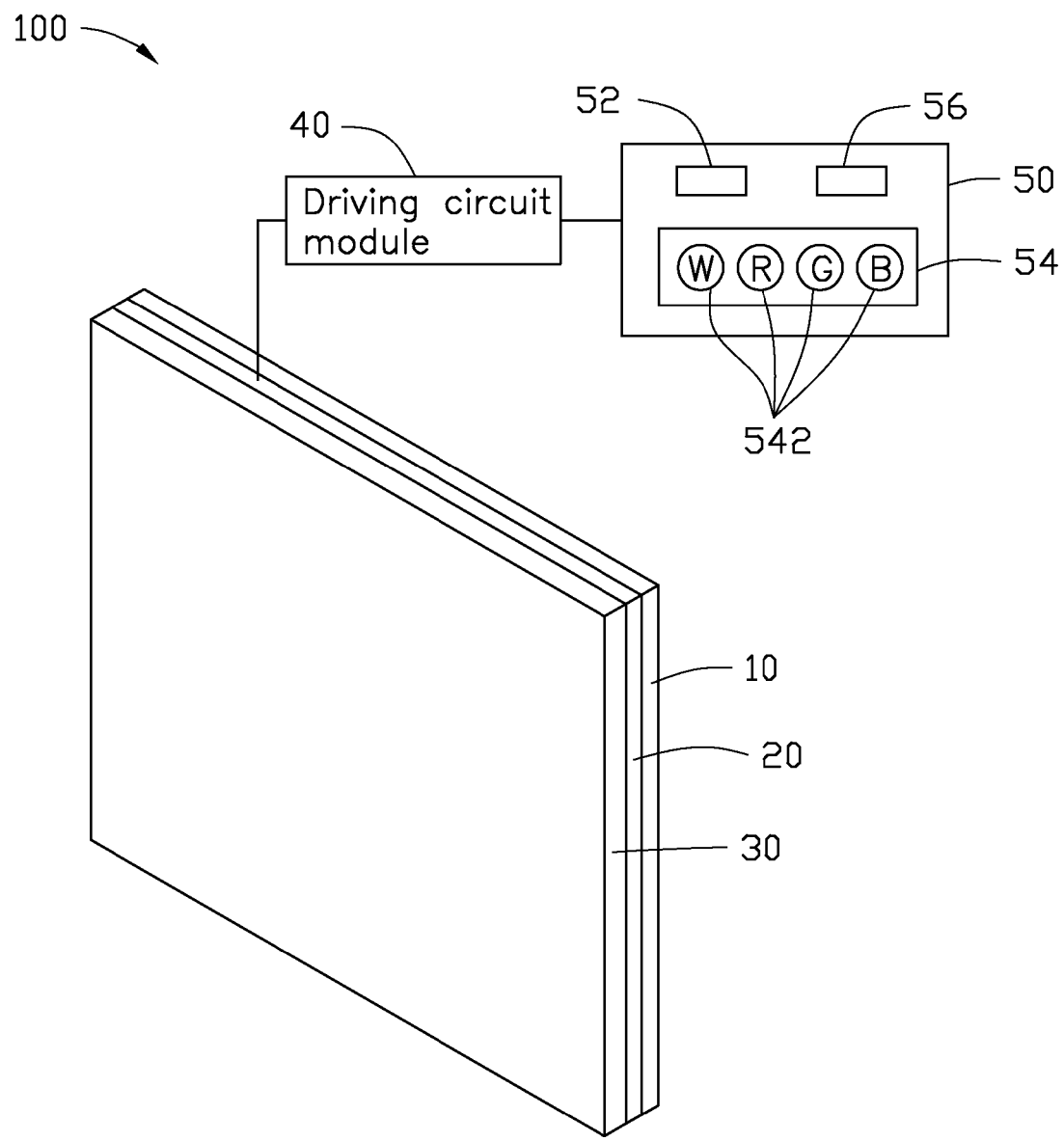
FIG. 1 is an assembled view of an embodiment of an electrical writing board.
Figure 2:
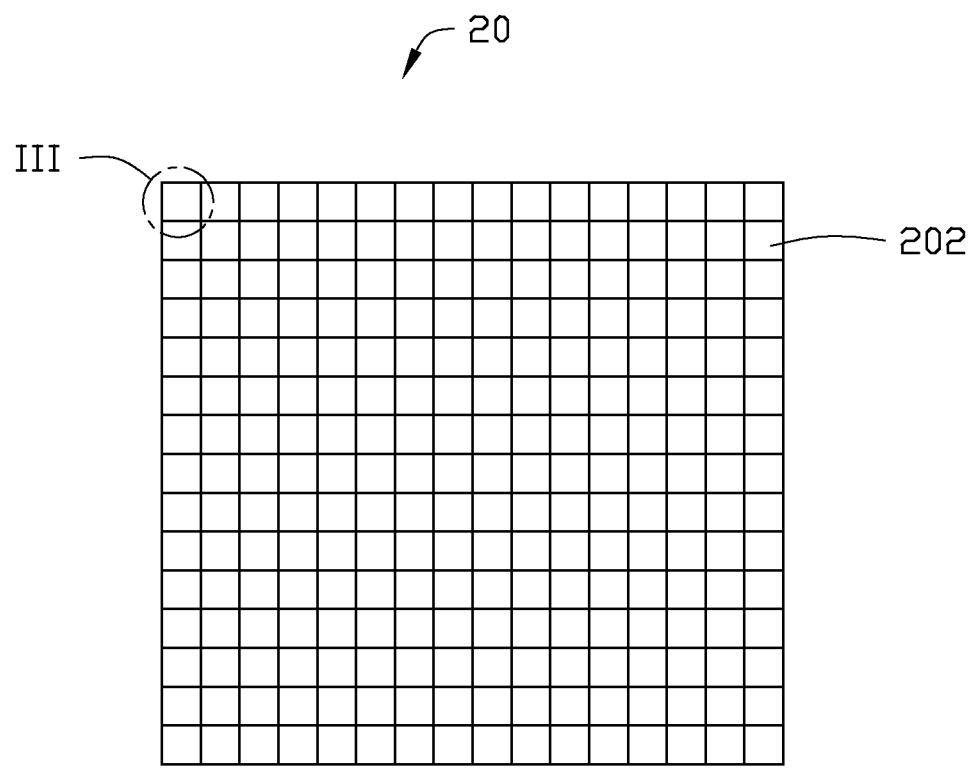
FIG. 2 is an isometric view of an electrochromic board of the electrical writing board of FIG. 1.
Figure 3:
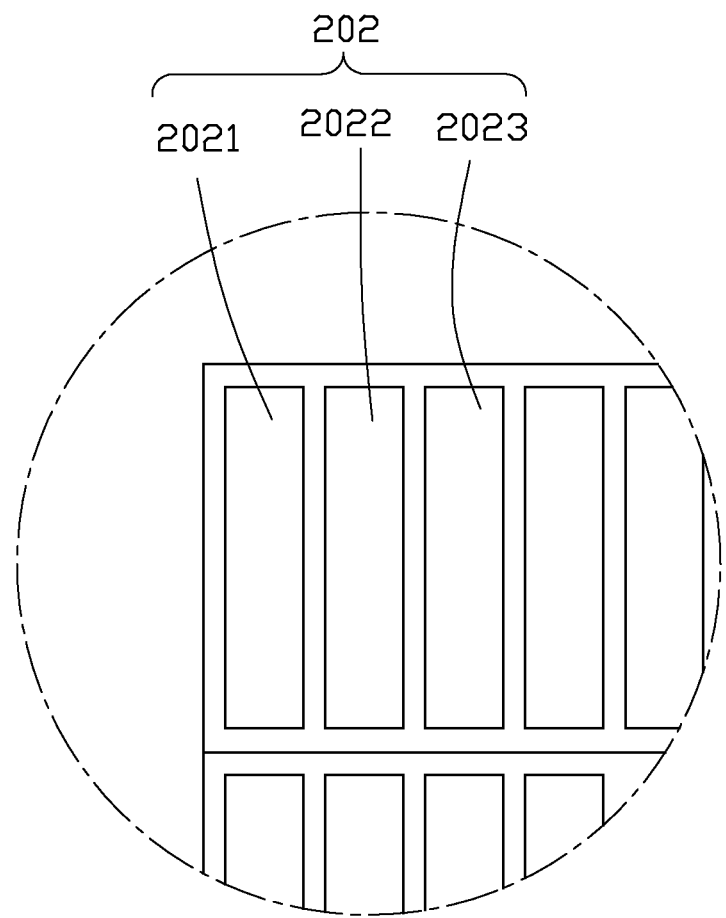
FIG. 3 is a partial enlarged view of a circled part III of FIG. 2.
Figure 4:
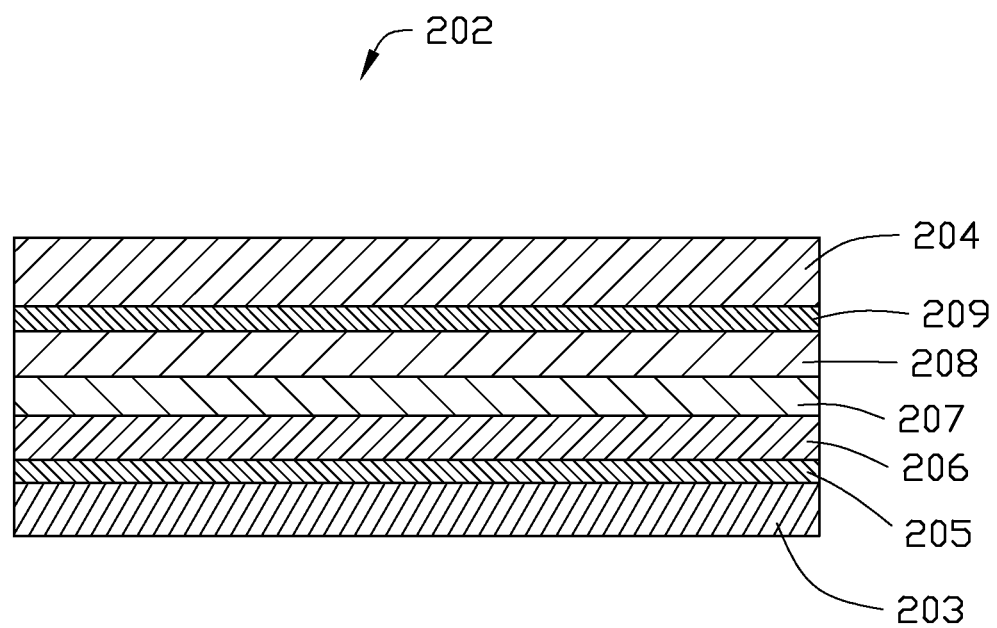
FIG. 4 is a cross-sectional view of an electrochromic pixel of an electrochromic unit of FIG. 3.
Figure 5:
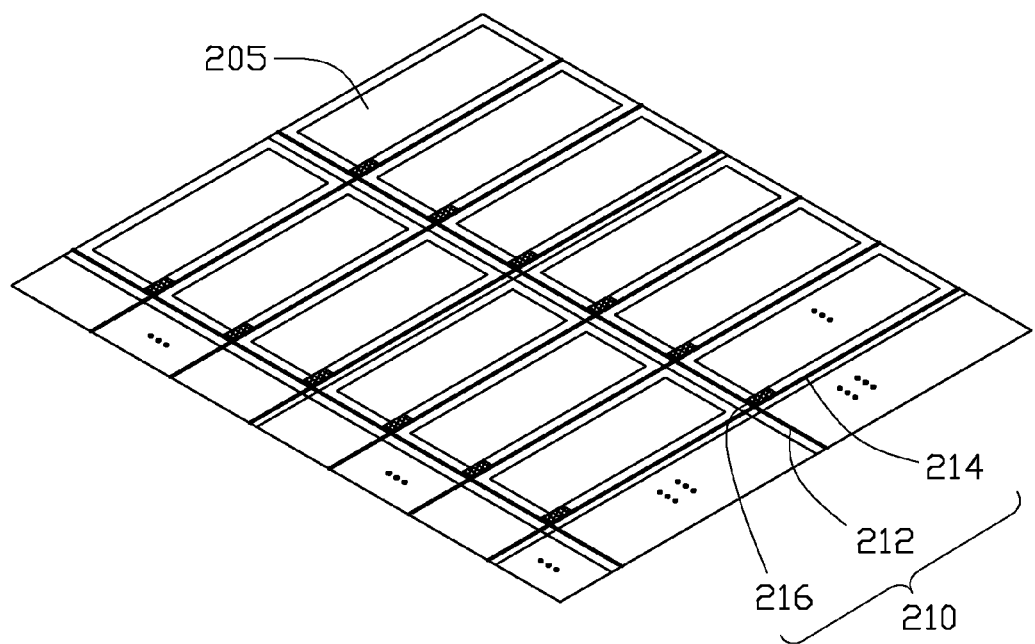
FIG. 5 is a driving circuit diagram of the electrochromic board of FIG. 2.

FIGS. 1-5 show an embodiment of an electrical writing board 100. The electrical writing board 100 includes a bottom color plate 10, an electrochromic board 20, a touch panel 30, a driving circuit module 40, and an operation module 50.

The bottom color plate 10 is rectangular, and is made of plastic or metal. The bottom color plate 10 includes a top surface (not labeled) and a bottom surface (not labeled) opposite to the top surface. A color film (not shown) is covered on the top surface. A color of the color film is greatly different from a color of the electrochromic board 20, therefore a handwriting formed on the electrochromic board 20 can be distinctly seen by a user. In the embodiment, the color of the color film is black or white.

The electrochromic board 20 is covered on the bottom color plate 10. The electrochromic board 20 includes a number of electrochromic units 202. Each electrochromic unit 202 includes three electrochromic pixels arranged on one line, the three electrochromic pixels are first, second, and third electrochromic pixels 2021, 2022, 2023. In the embodiment, the first, second, and third electrochromic pixels 2021, 2022, 2023 are three primary colors, for example, red, green, and blue, respectively.

The electrochromic board 20 is a multi-layers structure, the structures of the first, second, and third electrochromic pixels 2021, 2022, 2023 are the same. Each electrochromic pixel includes two transparent substrates 203, 204, and a first electrode layer 205, an electrochromic layer 206, an ion conductive layer 207, an ion storage layer 208, and a second electrode layer 209. The first electrode layer 205, the electrochromic layer 206, the ion conductive layer 207, the ion storage layer 208, and the second electrode layer 209 are orderly sandwiched by the transparent substrates 203, 204. The transparent substrate 203 covers the bottom color plate 10.

The transparent substrates 203, 204 are made of glass, sapphire, or transparent flexibility material. The first electrode layer 205 and the second electrode layer 209 are transparent, and made of indium oxide (ITO). The first electrode layer 205 includes a number of pixel electrodes respectively corresponding to the electrochromic pixels. The second electrode layer 209 is a common electrode.

The electrochromic layer 206 is made of electrochromic materials including inorganic electrochromic materials and organic electrochromic materials. The electrochromic layer 206 of the first electrochromic pixel 2021 is made of poly-o-phenylenediami. When a voltage drop is applied between the first electrode layer 205 and the second electrode layer 209 of the first electrochromic pixel 2021, the color of the electrochromic layer 206 of the first electrochromic pixel 2021 is changed between red and colourless. The electrochromic layer 206 of the second electrochromic pixel 2022 is made of tungsten trioxide ($WO_3$). When a voltage drop is applied between the first electrode layer 205 and the second electrode layer 209 of the second electrochromic pixel 2022, the color of the electrochromic layer 206 of the second electrochromic pixel 2022 is changed between blue and colourless. The electrochromic layer 206 of the third electrochromic pixel 2023 is made of prussian blue ($Fe_4[Fe(CN)_6]_3$). When a voltage drop is applied between the first electrode layer 205 and the second electrode layer 209 of the third electrochromic pixel 2023, the color of the electrochromic layer 206 of the third electrochromic pixel 2023 is changed between green and colourless.

The ion conductive layer 207 is an ion passage between the electrochromic layer 206 and the ion storage layer 208. Ions stored in the ion storage layer 208 move to the electrochromic layer 206 from the ion conductive layer 207 under the voltage drop applied between the first electrode layer 205 and the second electrode layer 209. The ions reaching the electrochromic layer 206 move to the ion storage layer 208 from the ion conductive layer 207 when the voltage drop applied between the first electrode layer 205 and the second electrode layer 209 is removed.

The electrochromic board 20 further includes a control circuit 210, printed on a side of the first electrode layer 205. The control circuit 210 includes a number of horizontal scanning lines 212 and a number of vertical scanning lines 214. The horizontal scanning lines 212 perpendicularly cross the vertical scanning lines 214. Each electrochromic pixel is positioned at a corner of an intersection point of one horizontal scanning line 212 and one vertical scanning line 214. A number of switching elements 216 are positioned at the corners of the intersection points, and electrically connected to the horizontal scanning lines 212 and the vertical scanning lines 214. Each switching element 216 is connected to the first electrode layer 205 of the adjacent one electrochromic pixel. If both of the horizontal scanning line 212 and the vertical scanning line 214 connected to the switching elements 216 input a high level signal (logic 1), the corresponding switching element 216 is turned on, and a voltage is applied on the first electrode layer 205 of the corresponding electrochromic pixel.

The touch panel 30 is covered on the electrochromic board 20, and is configured for outputting a touch signal when the touch panel 30 is touched. In the embodiment, the touch panel 30 can be a resistive touch panel, a capacitive touch panel, or an infrared touch panel.

The driving circuit module 40 is connected between the touch panel 30 and the control circuit 210. The driving circuit module 40 outputs enable signals to the control circuit 210 according to the touch signals output from the touch panel 30.

The operation module 50 is electrically connected to the driving circuit module 40, and includes a power button 52, a color choosing module 54, and an erase button 56. The electrical writing board 100 is turned on or turned off by pressing the power button 52. The color choosing module 54 includes four color buttons 542, for example, a red button, a green button, a blue button, and a white button. A color of the handwriting can be chosen by selecting the color buttons 542. The handwriting displaying on the electrical writing board 100 can be erased by the user when the erasing button 56 is pressed.

In the embodiment, when the red button is pressed, the first electrochromic pixel 2021 can be enabled, and the second electrochromic pixel 2022 and the third electrochromic pixel 2023 cannot be enabled. When the green button is pressed, the second electrochromic pixel 2022 can be enabled, and the first electrochromic pixel 2021 and the third electrochromic pixel 2023 cannot be enabled. When the blue button is pressed, the third electrochromic pixel 2023 can be enabled, and the first electrochromic pixel 2021 and the second electrochromic pixel 2022 cannot be enabled. When the white button is pressed, all of the first electrochromic pixel 2021, the second electrochromic pixel 2022, and the third electrochromic pixel 2023 can be enabled.

In use, first, the power button 52 is turned on by the user, and one of the color buttons 542, such as, the red button, is chosen. Then, the user touches the touch panel 30 to write a number, a letter, or a Chinese character. The touch panel 30 generates the touch signals and outputs the touch signals to the driving circuit module 40. The driving circuit module 40 enables the corresponding first electrochromic pixel 2021 by the switching elements 216 according to the touch signals. Therefore, the handwriting of the user displays on the electrochromic board 20. The handwriting displaying on the electrochromic board 20 is the same as a touch route sensed by the touch panel 30. When the user wants to erase the handwriting, the user presses the erasing button 56. The user touches the touch panel 30, the driving circuit module 40 switches off all of the first electrochromic pixels 2021. Therefore, the handwriting displaying on the electrochromic board 20 is erased.

In other embodiments, the bottom color plate 10, the electrochromic board 20, and the touch panel 30 can be packaged in one cell, and then the transparent substrates 203, 204 can be removed. The bottom color plate 10 and the touch panel 30 are respectively covered on the first electrode layer 205 and the second electrode layer 209. Furthermore, the ion storage layer 208 can be another electrochromic layer made of different electrochromic materials with the electrochromic layer 206. The characteristic of the electrochromic materials of the ion storage layer 208 is contrary to the characteristic of the electrochromic materials of the electrochromic layer 206. For example, the electrochromic layer 206 is made of anodic oxidation electrochromic materials, and the ion storage layer 208 is made of cathode reduction electrochromic materials.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electrical writing board, comprising:
a bottom color plate;
an electrochromic board covered on the bottom color plate and comprising a plurality of electrochromic units; each electrochromic unit comprising a first electrochromic pixel displaying a red color, a second electrochromic pixel displaying a green color, and a third electrochromic pixel displaying a blue color;
a touch panel covered on the electrochromic board and outputting a touch signal when the touch panel is touched; and
a driving circuit module electrically connected between the electrochromic board and the touch panel, and enabling a part of the electrochromic pixels according to the touch signal to display a handwriting; wherein the handwriting displaying on the electrochromic board is the same as a touch route sensed by the touch panel; and
an operation module electrically being connected to the driving circuit module; wherein the operation module comprising a power button, a color choosing module and an erasing button, the electrical writing board being turned on or turned off by pressing the power button, a color of the handwriting can be chose by selecting the color buttons, the handwriting displaying on the electrical writing board being erased when the erasing button is pressed, the color choosing module comprising a red button, a green button, a blue button, and a white button; when the red button being pressed, the first electrochromic pixel being enabled, and the second electrochromic pixel and the third electrochromic pixel being not enabled; when the green button being pressed, the second electrochromic pixel being enabled, and the first electrochromic pixel and the third electrochromic pixel being not enabled; when the blue button is pressed, the third electrochromic pixel being enabled, and the first electrochromic pixel and the second electrochromic pixel being not enabled; when the white button being pressed, all of the first electrochromic pixel, the second electrochromic pixel, and the third electrochromic pixel being enabled.

2. The electrical writing board of claim 1, wherein a color of the bottom color plate is different from a color of the electrochromic board.

3. The electrical writing board of claim 1, wherein the electrochromic board comprises a first electrode layer, an electrochromic layer, an ion conductive layer, an ion storage layer, and a second electrode layer orderly sandwiched between the bottom color plate and the touch panel.

4. The electrical writing board of claim 3, wherein the electrochromic layer of the first electrochromic pixel is made of poly-o-phenylenediami, the electrochromic layer of the second electrochromic pixel is made of tungsten trioxide, and the electrochromic layer of the third electrochromic pixel is made of prussian blue.

5. The electrical writing board of claim 4, wherein when a voltage drop is applied between the first electrode layer and the second electrode layer of the first electrochromic pixel, the color of the electrochromic layer of the first electrochromic pixel is changed between red and colourless; when a voltage drop is applied between the first electrode layer and the second electrode layer of the second electrochromic pixel, the color of the electrochromic layer of the second electrochromic pixel is changed between blue and colourless; when a voltage drop is applied between the first electrode layer and the second electrode layer of the third electrochromic pixel, the color of the electrochromic layer of the third electrochromic pixel is changed between green and colourless.

6. The electrical writing board of claim 3, wherein the ion conductive layer is an ion passage between the electrochromic layer and the ion storage layer; ions stored in the ion storage layer move to the electrochromic layer from the ion conductive layer under the voltage drop applied between the first electrode layer and the second electrode layer.

7. The electrical writing board of claim 3, wherein the electrochromic board further comprises two transparent substrates, all of the first electrode layer, the electrochromic layer, the ion conductive layer, the ion storage layer, and the second electrode layer are sandwiched between the two transparent substrates.

8. The electrical writing board of claim 3, wherein the electrochromic board further comprises a control circuit, and the control circuit is printed on a side of the first electrode layer.

9. The electrical writing board of claim 8, wherein the control circuit comprises a plurality of horizontal scanning lines and a plurality of vertical scanning lines, the horizontal scanning lines perpendicularly cross the vertical scanning lines, each electrochromic pixel is positioned at a corner of an intersection point of one horizontal scanning line and one vertical scanning line.

10. The electrical writing board of claim 9, wherein a plurality of switching elements are positioned at the corners of the intersection points, and are electrically connected to the horizontal scanning lines and the vertical scanning lines; each switching element is connected to the first electrode layer of the adjacent one electrochromic pixel.

11. An electrical writing board, comprising:
a bottom color plate;
an electrochromic board, the electrochromic board comprising a first electrode layer, an electrochromic layer, an ion conductive layer, an ion storage layer, and a second electrode layer orderly sandwiched between the bottom color plate and the touch panel, the electrochromic layer of the first electrochromic pixel is made of poly-o-phenylenediami, the electrochromic layer of the second electrochromic pixel is made of tungsten trioxide, and the electrochromic layer of the third electrochromic pixel is made of prussian blue, when a voltage drop is applied between the first electrode layer and the second electrode layer of the first electrochromic pixel, the color of the electrochromic layer of the first electrochromic pixel is changed between red and colourless; when a voltage drop is applied between the first electrode layer and the second electrode layer of the second electrochromic pixel, the color of the electrochromic layer of the second electrochromic pixel is changed between blue and colourless; when a voltage drop is applied between the first electrode layer and the second electrode layer of the third electrochromic pixel, the color of the electrochromic layer of the third electrochromic pixel is changed between green and colourless, the electrochromic board being covered on the bottom color plate and comprising a plurality of electrochromic units; each electrochromic unit comprising a first electrochromic pixel displaying a red color, a second electrochromic pixel displaying a green color, and a third electrochromic pixel displaying a blue color;
a touch panel covered on the electrochromic board and outputting a touch signal when the touch panel is touched; and
a driving circuit module electrically connected between the electrochromic board and the touch panel, and enabling a part of the electrochromic pixels according to the touch signal to display a handwriting; wherein the handwriting displaying on the electrochromic board is the same as a touch route sensed by the touch panel.

12. The electrical writing board of claim 11, wherein a color of the bottom color plate is different from a color of the electrochromic board.

13. The electrical writing board of claim 11, wherein the ion conductive layer is an ion passage between the electrochromic layer and the ion storage layer; ions stored in the ion storage layer move to the electrochromic layer from the ion conductive layer under the voltage drop applied between the first electrode layer and the second electrode layer.

14. The electrical writing board of claim 11, wherein the electrochromic board further comprises two transparent substrates, all of the first electrode layer, the electrochromic layer, the ion conductive layer, the ion storage layer, and the second electrode layer are sandwiched between the two transparent substrates.

15. The electrical writing board of claim 11, wherein the electrochromic board further comprises a control circuit, and the control circuit is printed on a side of the first electrode layer.

16. The electrical writing board of claim 15, wherein the control circuit comprises a plurality of horizontal scanning lines and a plurality of vertical scanning lines, the horizontal scanning lines perpendicularly cross the vertical scanning lines, each electrochromic pixel is positioned at a corner of an intersection point of one horizontal scanning line and one vertical scanning line.

17. The electrical writing board of claim 16, wherein a plurality of switching elements are positioned at the corners of the intersection points, and are electrically connected to the horizontal scanning lines and the vertical scanning lines; each switching element is connected to the first electrode layer of the adjacent one electrochromic pixel.

18. The electrical writing board of claim 11, further comprising an operation module being electrically connected to the driving circuit module; wherein the operation module comprises a power button, a color choosing module, and an erasing button; the electrical writing board is turn on or turn off by pressing the power button, a color of the handwriting can be chose by selecting the color buttons, the handwriting displaying on the electrical writing board is erased when the erasing button is pressed, and the color choosing module comprises a red button, a green button, a blue button, and a white button; when the red button is pressed, the first electrochromic pixel is enabled, and the second electrochromic pixel and the third electrochromic pixel are not enabled; when the green button is pressed, the second electrochromic pixel is enabled, and the first electrochromic pixel and the third electrochromic pixel are not enabled; when the blue button is pressed, the third electrochromic pixel is enabled, and the first electrochromic pixel and the second electrochromic pixel are not enabled; when the white button is pressed, all of the first electrochromic pixel, the second electrochromic pixel, and the third electrochromic pixel are enabled.

* * * * *